(12) United States Patent
Shaw

(10) Patent No.: US 7,894,369 B2
(45) Date of Patent: Feb. 22, 2011

(54) NETWORK PHYSICAL CONNECTION INFERENCE FOR IP TUNNELS

(75) Inventor: James Mark Shaw, Cary, NC (US)

(73) Assignee: OPNET Technologies, Inc., Bethesda, MD (US)

( * ) Notice: Subject to any disclaimer, the term of this patent is extended or adjusted under 35 U.S.C. 154(b) by 822 days.

(21) Appl. No.: 11/506,648

(22) Filed: Aug. 18, 2006

(65) Prior Publication Data

US 2007/0041355 A1 Feb. 22, 2007

Related U.S. Application Data

(60) Provisional application No. 60/709,769, filed on Aug. 19, 2005.

(51) Int. Cl.
*H04L 12/28* (2006.01)

(52) U.S. Cl. ........................................ 370/254; 370/401

(58) Field of Classification Search .................. 370/241, 370/248, 254, 255, 401, 402, 409
See application file for complete search history.

(56) References Cited

U.S. PATENT DOCUMENTS

| 6,173,399 | B1 * | 1/2001 | Gilbrech | 713/153 |
| 6,405,248 | B1 * | 6/2002 | Wood | 709/223 |
| 6,717,944 | B1 * | 4/2004 | Bryden et al. | 370/392 |
| 2004/0037260 | A1 * | 2/2004 | Kakemizu et al. | 370/338 |
| 2005/0022189 | A1 * | 1/2005 | Proulx et al. | 718/100 |
| 2006/0059370 | A1 * | 3/2006 | Asnis et al. | 713/189 |

* cited by examiner

*Primary Examiner*—Chirag G Shah
*Assistant Examiner*—Minh-Trang Nguyen
(74) *Attorney, Agent, or Firm*—Robert M. McDermott, Esq.

(57) ABSTRACT

The physical connection corresponding to IP tunnels in a network are found by tracing through the device configuration and routing tables at the routers in the network to determine the outbound interface associated with each tunnel endpoint, and then inferring a likely return interface associated with the opposite tunnel endpoint. Depending upon the particular configurations, a variety of tests can be applied to validate the inference. Patricia trees are preferably used to store and process the configuration data for efficient tracing through the routing tables at each router.

10 Claims, 3 Drawing Sheets

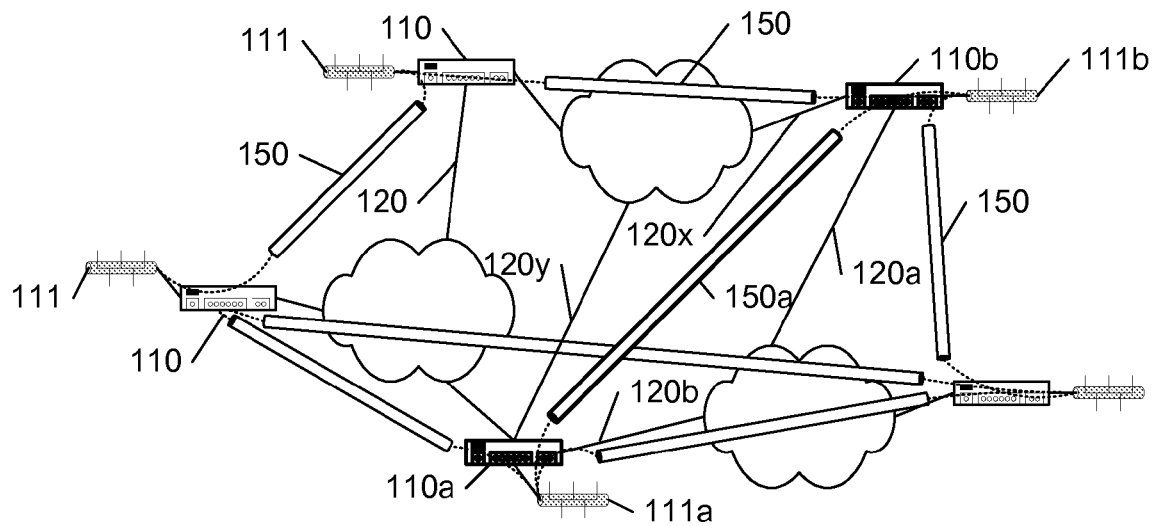
FIG. 1
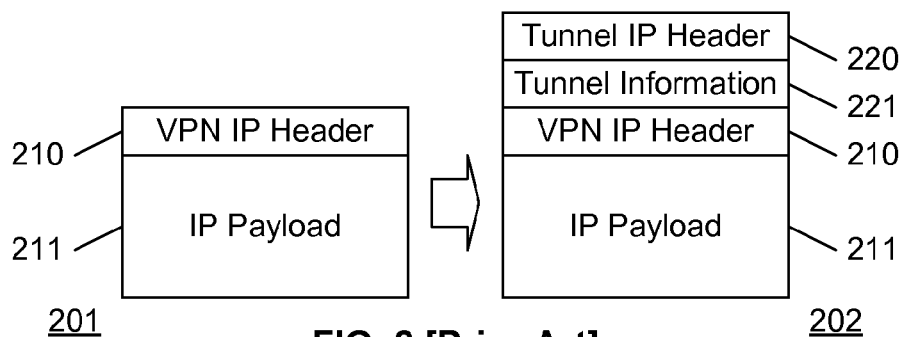
FIG. 2 [Prior Art]
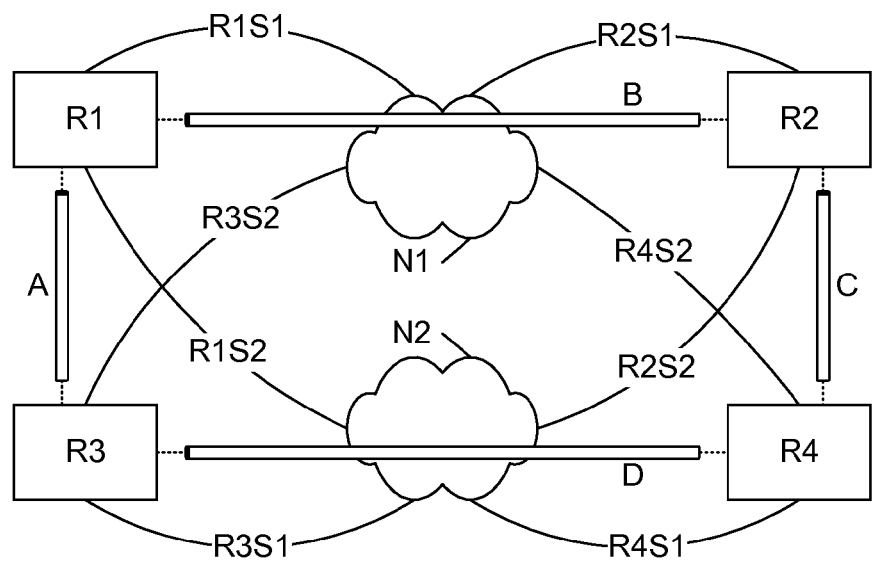
FIG. 3

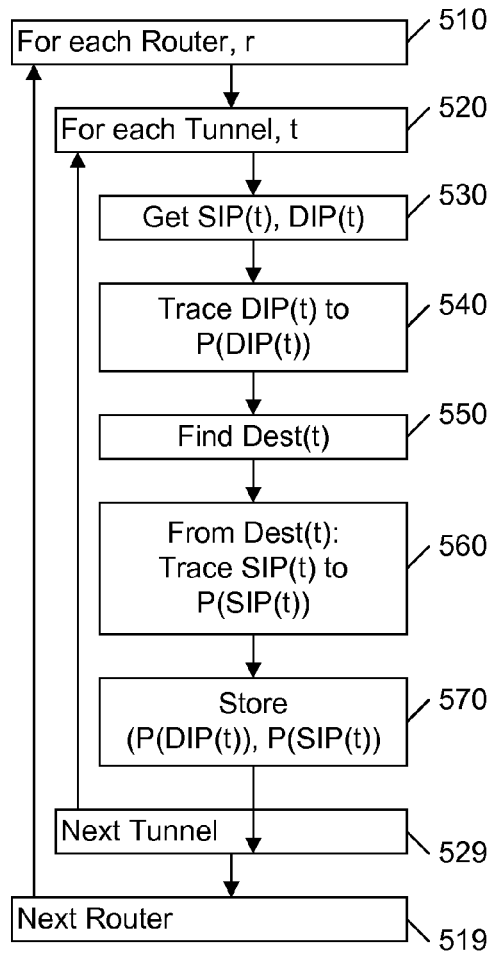
FIG. 5A
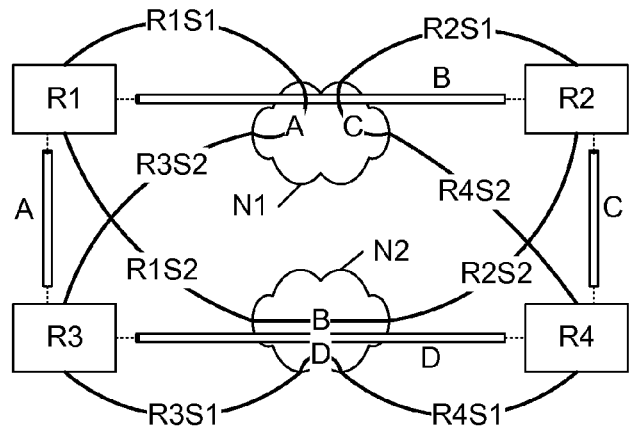
FIG. 5C
| Tunnel | SIP | DIP | P(DIP) | Dest | P(SIP) |
|---|---|---|---|---|---|
| T1 on R1 | 11.1.1.1 | 11.3.1.2 | R1S1 | R3 | R3S2 |
| T2 on R1 | 11.1.1.2 | 11.2.1.2 | R1S2 | R2 | R2S2 |
| T1 on R2 | 11.2.1.1 | 11.4.1.1 | R2S1 | R4 | R4S2 |
| T2 on R2 | 11.2.1.2 | 11.1.1.2 | R2S2 | R1 | R1S2 |
| T1 on R3 | 11.3.1.1 | 11.4.1.2 | R3S1 | R4 | R4S1 |
| T2 on R3 | 11.3.1.2 | 11.1.1.1 | R3S2 | R1 | R1S1 |
| T1 on R4 | 11.4.1.1 | 11.2.1.1 | R4S2 | R2 | R2S1 |
| T2 on R4 | 11.4.1.2 | 11.3.1.1 | R4S1 | R3 | R3S1 |
FIG. 5B

NETWORK PHYSICAL CONNECTION INFERENCE FOR IP TUNNELS

This application claims the benefit of U.S. Provisional Patent Application 60/709,769, filed 19 Aug. 2005.

BACKGROUND AND SUMMARY OF THE INVENTION

This invention relates to the field of network analysis, and in particular to network modeling.

The management of a complex network requires the use of tools that facilitate the analysis and diagnosis of network performance, and tools have been developed to ease this task. Many of the tools that have been developed for such analysis and diagnosis employ models of the networks to emulate/simulate the actual operations that occur within the network, or to predict performance parameters related to the expected performance of the network under a variety of conditions.

In order to effectively model the performance of a network, it is often necessary to model the physical topology of the network. For example, propagation delays are dependent on the geographic length of the communication paths, communications within local subnetworks avoid the access delays associated with wide-area networks, and so on.

In many cases, the 'logical' or 'virtual' connections that are created within a network obscure the physical topology of the network, and often the virtual structure of the network has little or no correspondence to the physical network. FIG. 1 illustrates an example network with routers 110 that provide connectivity between nodes on a local network 111 to remote nodes on other local networks 111. For ease of reference, the term router is used herein to identify any element of a network that is configured to affect or control the path that a packet takes as it is propagated from a source to a destination. That is, for example, a router includes any switching element that selects a path for the a packet, as well as any element that modifies a packet to affect the path that such a switching element may select, or any element that modifies the switching element based on packet content, and so on, wherein these elements may include hardware, software, firmware, or combinations thereof.

Physical connections 120 provide connectivity between the routers 110, and virtual connections 150 allow nodes on different physical networks 111 to appear to be members of the same subnetwork. In the example of FIG. 1, local networks 111a and 111b are connected via a virtual connection 150a. This virtual connection 150a conceals the fact that these networks 111a and 111b may be distant from each other, and conceals the actual physical path upon which messages will travel between networks 111a and 111b. From the network diagram of FIG. 1, it cannot be determined, for example, whether such messages will travel the path 120a-120b, or the path 120x-120y.

In the Internet Protocol (IP) arena, IP tunnels are used to create virtual connections, to create Virtual Private Networks (VPN). FIG. 2 illustrates how messages that are addressed to remote nodes on a VPN are processed to effect the virtual connection. The IP packet 201 includes a data payload 211 and header information 210 that includes the destination address for the packet. In this example, the header information 210 would include the address of the destination within the virtual network. Commonly, this address is an IP private address (defined in the IP specification as addresses within particular ranges, such as addresses beginning with "10", or "192.168") that routers will recognize as being local, and are not to be routed beyond the local network.

Using IP tunneling, a router is configured to recognize an address as corresponding to a defined tunnel. Packets that are addressed to a tunneled VPN address 210 are encapsulated within an IP packet 202 by adding a second IP header 220 before the original header 210 in the VPN-addressed packet. The added tunnel IP header 220 includes the tunnel endpoint addresses, and the packet 202 may also include other tunnel information 221. When the packet 202 reaches the tunnel endpoint, the tunnel's IP header 220 and any additional tunnel information 221 is stripped off, producing a copy of the original VPN packet 201 with the original VPN address 210. This copy of the packet 201 is thereafter propagated at the local network at the tunnel endpoint in the same manner as it would have been propagated had it originated in the local network at the tunnel endpoint.

A common difficulty in network modeling is the modeling of IP tunnels, because the virtual private network is specifically provided to appear to be a local network, and the physical topology is masked. For a typical IP tunnel, the tunnel physical source and/or destination network interface may not be explicitly stated in the device configuration, and the tunnel configuration may lack source interface information, or refer to a logical source or destination loopback interface.

Another difficulty associated with the modeling of IP tunnels is the use of dynamic routing, wherein the physical topology may change based on changing configurations, device faults, and so on. Thus, even if a user defines the physical topology corresponding to an IP tunnel, dyamic routing may quickly render that defined topology obsolete.

Commonly, IP tunnels are used to provide a virtual path through a public network. In such a case, the actual physical path within the public network is unknown, and is generally modeled as a 'black box' or 'cloud', with physical input/output interfaces, but lacking details regarding the internals of the cloud. Although the physical model of the internals of such clouds is unavailable, the modeling of the network of interest, external to the clouds, often requires or benefits from knowing how the network is coupled to the clouds, including how each tunnel is physically coupled to each cloud.

Further compounding the difficulty of modeling IP tunnels is the use of dynamic tunnels wherein each tunnel is created on an 'as needed' basis.

It is an objective of this invention to provide a method and system that determines the actual physical source and destination interfaces used to carry tunnel data. It is a further objective of this invention to provide a method and system to determine the physical path between the tunnel endpoints.

These objectives, and others, are achieved by tracing through the device configuration and routing tables at the routers in a network to determine the outbound interface associated with each tunnel endpoint, and then inferring a likely return interface associated with the opposite tunnel endpoint. Depending upon the particular configurations, a variety of tests can be applied to validate the inference. Patricia trees are preferably used to store and process the configuration data for efficient tracing through the routing tables at each router.

BRIEF DESCRIPTION OF THE DRAWINGS

The invention is explained in further detail, and by way of example, with reference to the accompanying drawings wherein:

FIG. 1 illustrates an example network diagram that contains physical and virtual connections.

FIG. 2 illustrates conventional encapsulation to effect IP tunneling.

FIG. 3 illustrates an example network of four routers with physical and virtual connections.

FIG. 5A illustrates an example flow-diagram for determining the physical topology of tunnels in a network in accordance with this invention, and FIGS. 5B-5C illustrate the operation of this flow-diagram as applied to the example four-router network of FIG. 3 and FIGS. 4A-D.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 4A:
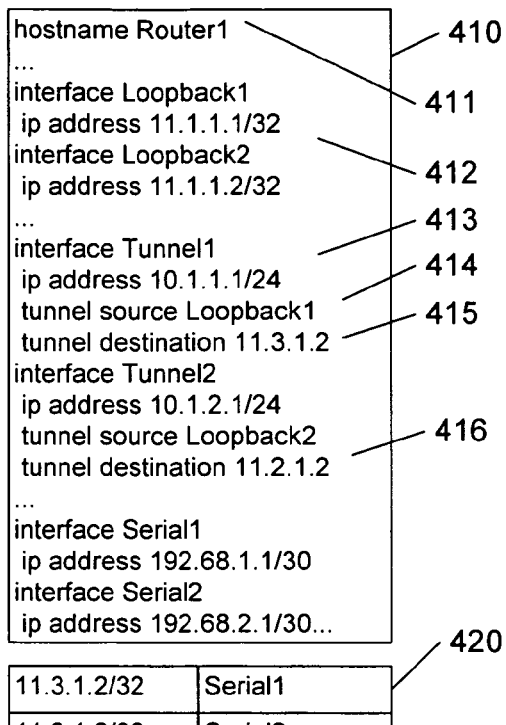
FIGS. 4A-4D illustrate example configuration data and routing table data corresponding to the four routers in FIG. 3.
Figure 4B:
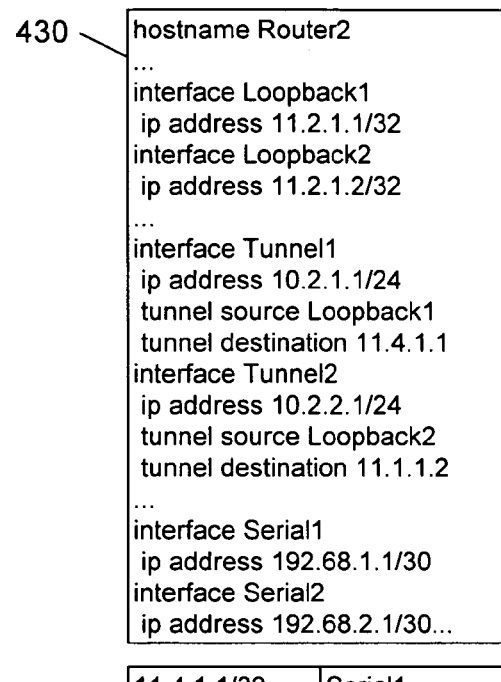
Figure 4C:
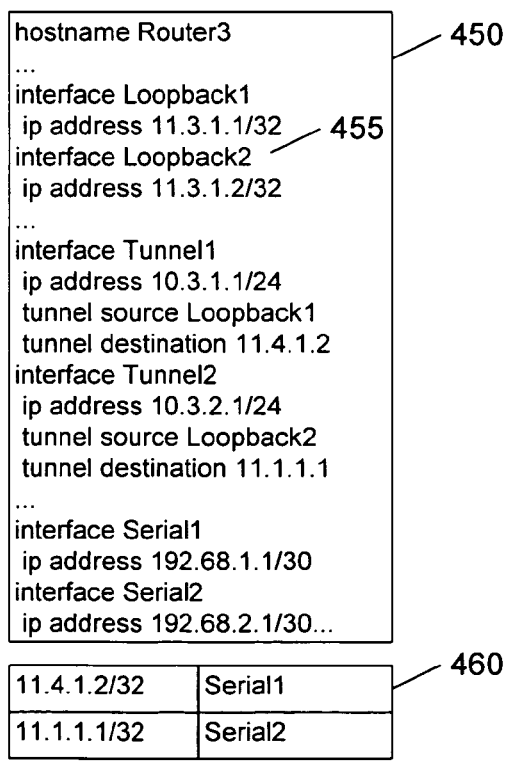
Figure 4D:
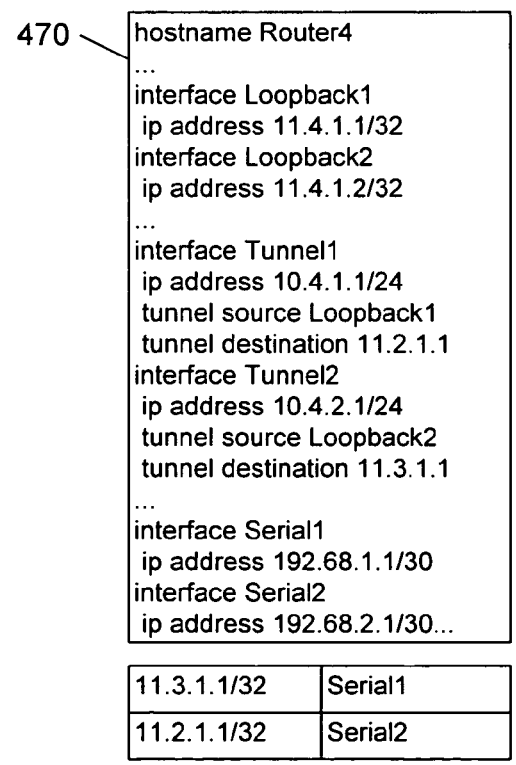

FIG. 3 illustrates an example network of four routers R1-R4 with physical R1S1-R4S4 and virtual A-D connections among these routers. In this example, each router R1-R4 has two physical connections, or interfaces, to external networks N1, N2. As will be seen in FIGS. 4A-4D, the routers are named "Router1", "Router2", etc., and the physical connections at each router are named "Serial1 and Serial2", and thus in FIG. 3, these serial connections are identified as R1S1 (Router1, Serial1), R1S2 (Router1, Serial2), R2S1, R2S2, and so on. In this example, assuming that the tunnel is embodied as a single bi-directional channel between the routers, each tunnel A, B, C, D may be embodied as two possible physical paths. Tunnel A, between R1 to R3, for example, may be embodied via connections R1S2 (R1-N2) and R3S2 (N2-R3), or via connections R1S1 (R1-N1) and R3S2 (N1-R3).

To create an IP tunnel between two network devices, the tunnel must be defined at a source end point of the tunnel. At a minimum, the destination end point of the tunnel must be specified, or, if the tunnel is dynamic, determinable at some point. IP tunnels are often configured in pairs, to provide a bi-directional tunnel. Because the bi-directional tunnel is defined to provide routing out from each end, each end considers itself the 'source' end, and the 'other end' is the 'destination' end. Thus, at a minimum, the destination end of the tunnel from each source end must be defined or determinable. This tunnel destination is defined as an IP address residing on an interface of the destination device. Optionally, the local tunnel source may be specified as either an IP address or interface name. Because the source and destination interfaces referenced may be logical loopback interfaces, the physical interfaces associated with the tunnel are not immediately apparent. FIGS. 4A-4D illustrate example configuration data 410, 430, 450, 470 corresponding to the four routers R1, R2, R3, R4 in FIG. 3, respectively. Using router R1's data 410 as an example, the hostname entry 411 identifies the name of the device, and the interface entries 412 associate interface names to an IP addresses. At 413, a tunnel name 'Tunnel' is defined, and associated to IP address 10.1.1.1/24. In this manner, packets that are destined for this address are tunnel encapsulated, as described with reference to FIG. 2, and transmitted to the tunnel destination, defined at 415 as IP address 11.3.1.2. In similar manner, Tunnel2 corresponds to IP address 10.1.2.1/24; its tunnel source address is Loopback2 (IP: 11.1.1.2, at 412), and its destination address 416 is 11.2.1.2.

Block 420 illustrates an extract of information from the routing table of Router1. As is known in the art, a routing table indicates a 'next hop' for routing a packet, based on the destination address of the packet. Alternatively, the routing of specific addresses to specific next hop may be included in the configuration data 410, if the routing is static. In this example, packets addressed to IP address 11.3.1.2 are routed to "Serial1", which in this example defines the aforementioned physical connection to the net N1 of FIG. 3. In this example, the routing table leads directly to a determination of the physical connection that leads to the destination address. In other situations, if the "next hop" indicates another router, the routing table of the router(s) identified as the "next hop" can be recursively assessed until the physical connection to the destination address, or the destination address itself, is reached. That is, the recursion continues until the route specifies an outgoing interface, or a next hop address is equal to the destination address. Alternatively, the extent of the recursive tracking through the next hops can be determined by the particular network analysis tool for which the physical topology of the tunnel is being sought.

Thus, in accordance with one aspect of this invention, by tracing the tunnel information from the configuration data 410 and the routing table 420, it can be determined that packets that are routed to private address 10.1.1.1 will be encapsulated into packets addressed to the tunnel destination 11.3.1.2, which will be routed to physical interface Serial1 (R1S1 of FIG. 3). This defines the physical connection corresponding to Tunnel1's destination, but does not, per se, define the topology of the tunnel, because it only defines the physical connection to N1, and does not define the path beyond N1. That is, at this point, it has not yet been determined that the Tunnel1's end is at Router3. Note that in some applications, this information may be sufficient. For example, some applications merely need to know the physical connection directly between the source and destination within the network, or the physical connection up to an interface to an external network ('cloud') for which it only has an abstract representation.

Because the destination address is globally unique, the identity of the device corresponding to the tunnel destination 11.3.1.2 can be found from the network configuration data, using any of a variety of techniques common in the art. For example, most network analysis tools are configured to identify the global IP addresses that are local to each router in the modeled network, and a simple search of these addresses will identify that, in this example, Router3 includes IP address 11.3.1.2 as a local address. Also in this example, a search of Router3's sample configuration data indicates that IP address 11.3.1.2 is associated with Router3's Loopback2 interface, at 455. Thus, in accordance with another aspect of this invention, by processing the network configuration data, it is determined that the destination of Tunnel1 at Router1 is at Router3; however, at this point, the physical interface to Router3 for this tunnel has not yet been determined. Similar to the discussion above, in some applications, this information may be sufficient. For example, if the physical connection leads to an interface to an external network ('cloud') for which the application only has an abstract representation, the application may only be concerned with the eventual destination device, regardless of how that device interfaces with the external network.

Because the interfaces at which inbound packets arrive are not explicitly defined, per se, the physical interface for packets from Tunnel1 at Router1 to Router3 cannot be absolutely determined. However, in accordance with another aspect of this invention, because most interfaces are symmetric, in that the same interface is used for incoming as well as outgoing packets from and to a given IP address, the physical interface for packets from the tunnel to Router3 can be inferred from the physical interface defined for packets from Router3 to the tunnel's source IP address, at Router1. In this example, Tunnel1's source IP address at Router1 is defined as Loopback1 414. Subsequent tracing for Loopback1 indicates that it has an IP address of 11.1.1.1/32, at 412. A search of Router3's routing table 460 indicates that this IP address 11.1.1.1/32 is routed to physical interface Serial1 on Router3. That is, packets from Router3 to the source IP address of Tunnel1 on Router1 will be routed to physical interface Serial1 on Router3. Assuming a symmetric interface, it is thus inferred that packets from Tunnel1 on Router1 to Router3 will arrive at physical interface Serial1 on Router3.

As illustrated by this example, by tracing the configuration data and routing tables at a source end of a tunnel, the global destination IP address and the physical interface for packets addressed to this IP address are determined; and, by tracing the configuration data and routing tables at the determined global destination IP address, the physical interface for packets arriving at this IP address can be inferred.

FIG. 5A illustrates a flow diagram for a process to determine the topology of tunnels in a network in accordance with this invention. FIGS. 5B-5C illustrate the application of the flow diagram of FIG. 5A to the network illustrated in FIG. 3, configured as indicated in FIGS. 4A-4D.

The loop 510-519 processes the configuration and routing information at each router in the network. The loop 520-529 processes each tunnel defined in the configuration. For each defined tunnel end at each router, the tunnel source and destination IP addresses (SIP and DIP) are determined 530 from the tunnel definition in the configuration data at the source router. This may require tracing through the configuration data, if symbolic names are used, such as the use of "loopback1" and "loopback2" in FIGS. 4A-4D.

At 540, the physical interface P(DIP) associated with the destination IP address is determined from the routing table, or, if the route is static, from the configuration data. As illustrated in FIG. 5B, at 591, using the configuration 410 and routing 420 information at Router1 (FIG. 4A), the source IP (SIP) of Tunnel1 on Router1 (T1 on R1) is 11.1.1.1, the destination IP (DIP) is 11.3.1.2, and the physical interface P(DIP) assigned to this destination IP (from 420 in FIG. 4A) is Serial1 on Router1, which is illustrated in FIGS. 3 and 5B-5C as R1S1. In this example, the routing table indicates the physical interface directly; alternatively, as discussed above, the physical interface may be determined by the recursive tracking through the routing tables of each identified next-hop router until a physical interface is found, or the destination IP is found as the next-hop.

At 550, the destination router corresponding to the destination IP is determined, by identifying the router having this address as a local address, as discussed above. At 560, the routing table of the destination router is assessed to determine the physical interface P(SIP) that is used for sending packets from the destination router to the source IP address of the tunnel (SIP). In the example at 551 of FIG. 5B, the destination router (Dest) corresponding to the destination IP address (DIP) 11.3.1.2 is Router3 (R3), and the routing table 460 of Router3 (FIG. 4C) indicates that the Source IP (SIP) 11.1.1.1 is associated with physical interface Serial2 on Router3 (R3S2 in FIGS. 3 and 5B-5C). Assuming that this interface is symmetric, it can be inferred that Router3 receives packets from the tunnel via this interface.

At 560, the determined and inferred physical interfaces, P(DIP) and P(SIP), respectively, corresponding to the tunnel are stored. In a preferred embodiment, if determining the physical interface required tracing through one or more next-hop entries, the traced path would be stored as well.

The above process is repeated for each tunnel being mapped. In this manner, as illustrated in the second row of FIG. 5B, the processing of the configuration and routing information corresponding to Tunnel2 at Router1 in FIG. 4A indicates T2 at R1 has a tunnel source IP address of 11.1.1.2, destination IP address of 11.2.1.2, and a corresponding physical connection to this destination IP address of R1S2. This destination IP address corresponds to a local address of Router2, and, by tracing the tunnel's source IP address 11.1.1.2 from Router2's routing table, it can be inferred that Router2 receives packets from this tunnel on its Serial2 interface, R2S2. The remaining rows of information in FIG. 5B correspond to the tunnel information captured from the configuration and routing information of FIGS. 4B-4D, corresponding to routers R2-R4 in FIG. 3.

In the example of FIGS. 3, 4B-D, 5B-C, the tunnels are configured in pairs, as is common in most typical network configurations. In a preferred embodiment of this invention, this tunnel-pairing is used to validate or reaffirm the inferred physical connections corresponding to the tunnels. Consider, for example, entries 591 and 596 in FIG. 5B. These entries correspond to the pair of tunnels that are identified as tunnel A in FIGS. 3 and 5C. Each of these tunnels T1 on R1 and T2 on R3 indicate the same pair of source and destination IP addresses, and correspondingly the same physical interfaces R1S1 and R3S2, which reaffirms the assumption that they form a pair, and reaffirms the inference that the interfaces at each end are likely to be symmetric. In like manner, other tests can be used to reaffirm the inferred physical connections, such as determining that the tunnel IP addresses are on the same sub-network. It should be noted that such pairing-tests are not conclusive of the validity or invalidity of the inferred physical connection, but merely serve to provide a 'measure of confidence' in the inference.

The identification of tunnel pairs can also be used to simplify the process illustrated in FIG. 5A. For example, at 530, the source and destination IP addresses are determined for the current tunnel. If a prior processed tunnel has the same pair of IP addresses, but arranged as destination and source IP addresses, i.e. complementary source and destination IP addresses, then these tunnels form a complementary pair, and the subsequent processes 540-560 can be skipped for this new tunnel. That is, for example, as Tunnel2 on Router3 (row 596 in FIG. 5B) is being processed, when it is detected that Router3's SIP and DIP correspond to Router1's DIP and SIP, respectively, the remaining fields on row 596 can be filled in directly from the (complementary) information at row 591.

FIG. 5C illustrates the network diagram of FIG. 3, augmented to include the physical connections corresponding to each of the tunnel pairs A-D. That is, tunnel-pair A, between R1 and R3 include physical connections R1S1 (R1-N1) and R3S2 (N1-R3); tunnel-pair B, between R1 and R2 include physical connections R1S2 (R1-N2) and R2S2 (N2-R2); and so on.

Thus, as shown, the process as illustrated in FIG. 5A serves to identify the likely physical connectivity corresponding to IP tunnels within a network. One of ordinary skill in the art will recognize that this process includes multiple comparisons of IP addresses, often including determining whether an IP address or set of IP addresses is a subset of another set of IP addresses. For efficient processing, a radix or Patricia tree is preferably used to store the IP addresses obtained from the routing devices, consistent with the use of Patricia trees for searching routing tables for a destination address. A radix tree search minimizes the number of bits to be tested to distinguish among a set of bit strings. U.S. Pat. No. 5,881,241, "System for transmitting data packet after matching data packet's routing pattern with predetermined data routes stored in a route table", issued 9 Mar. 1999 to John R. Corbin, provides a description of Patricia tree search techniques for IP addresses, and is incorporated by reference herein.

Although the invention is presented as a technique for finding the physical connections corresponding to all the tunnels of a network, one of ordinary skill in the art will recognize that the disclosed techniques can be applied to find the physical connection of specific tunnels, as well, so that, for example, the technique can be applied dynamically or on an as-required basis, such as determining the current physical connection of a tunnel in a network that includes dynamic routing to facilitate the diagnosis of faults or anomalous network behavior.

The techniques presented above can also be applied to dynamic tunnels, in which the destination is not explicitly defined. A common example of this is Dynamic Multipoint Virtual Private Network (DMVPN) technology of Cisco Systems, which uses a hub and spoke topology to dynamically create tunnels on an "as needed" basis. The device configured to be the hub router is responsible for creating tunnels between the spoke routers that need to communicate, thereby eliminating the need to configure spoke-to-spoke tunnels for all possible pairs of communicating devices. Instead, each spoke device configuration requires knowledge of the hub router's IP address.

In a preferred embodiment of this invention for networks that include dynamic tunnels, the IP address of the hub router is used to determine the physical interfaces used to carry the tunnel network data. As described for static tunnels, the source and destination devices' route data are used to find the outbound interface to the hub router IP address, and the resulting physical interfaces are used as endpoints of a link representing the physical path between the devices. As with static tunnels, this connection can either represent the actual link between the interfaces, or an abstraction of an intervening network not contained within the network model.

The foregoing merely illustrates the principles of the invention. It will thus be appreciated that those skilled in the art will be able to devise various arrangements which, although not explicitly described or shown herein, embody the principles of the invention and are thus within its spirit and scope. For example, if the tunnel definition does not explicitly identify a source IP address, the captured source IP address could include a list of all the IP addresses associated with the router and its local subnetwork, and the determination of return path to the tunnel source could include comparing identifying the physical connections at the destination corresponding to this list of possible IP addresses to determine a likely return path. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

I claim:

1. A method comprising:
identifying, by a network analysis system, a first destination address of a first tunnel from configuration data associated with a first router,
tracing, by the network analysis system, the first destination address to determine a first physical interface corresponding to the first destination address from routing information associated with the first router,
determining, by the network analysis system, a second router corresponding to the first destination address based on configuration data associated with the second router,
identifying, by the network analysis system, a first source address of the first tunnel from the configuration data associated with a first router,
tracing, by the network analysis system, the first source address to determine a second physical interface corresponding to the first source address from routing information associated with the second router, and
enhancing, by the network analysis system, a model of a physical topology of the network based on the determination of the first physical interface corresponding to the first destination address and the second physical interface corresponding to the first source address.

2. The method of claim 1, including defining a physical connection corresponding to the first tunnel as a combination of the first and second physical interfaces.

3. The method of claim 2, including providing the physical connection corresponding to the first tunnel to a network analysis tool.

4. The method of claim 1, including identifying a second source address and a second destination address of a second tunnel from configuration data associated with the second router, defining a physical connection corresponding to the second tunnel as a combination of the first and second physical interfaces based on whether the second destination address corresponds to the first source address and the first destination address corresponds to the second source address.

5. The method of claim 1, wherein the routing information associated with the first router includes routing entries in a routing table of the first router, and the routing information associated with the second router includes routing entries in a routing table of the second router.

6. A computer program on a non-transitory computer-readable medium that is configured to cause a processor to:
- identify a first destination address of a first tunnel from configuration data associated with a first router,
- trace the first destination address to determine a first physical interface corresponding to the first destination address from routing information associated with the first router,
- enhance a model of a physical topology of the network based on the determination of the first physical interface corresponding to the first destination address, determine a second router corresponding to the first destination address based on configuration data associated with the second router,
- identify a first source address of the first tunnel from the configuration data associated with a first router,
- trace the first source address to determine a second physical interface corresponding to the first source address from routing information associated with the second router, and
- enhance the model of a physical topology of the network based on the determination of the second physical interface corresponding to the first source address.

7. The computer program of claim 6, which causes the processor to define a physical connection corresponding to the first tunnel as a combination of the first and second physical interfaces.

8. The computer program of claim 7, which causes the processor to provide the physical connection corresponding to the first tunnel to a network analysis tool.

9. The computer program of claim 6, which causes the processor to identify a second source address and a second destination address of a second tunnel from configuration data associated with the second router, define a physical connection corresponding to the second tunnel as a combination of the first and second physical interfaces based on whether the second destination address corresponds to the first source address and the first destination address corresponds to the second source address.

10. The computer program of claim 6, wherein the routing information associated with the first router includes routing entries in a routing table of the first router, and the routing information associated with the second router includes routing entries in a routing table of the second router.

* * * * *